US011192338B2

(12) United States Patent
Desai et al.

(10) Patent No.: US 11,192,338 B2
(45) Date of Patent: Dec. 7, 2021

(54) FILMS FOR USE AS INTERLEAVES BETWEEN SUBSTRATES

(71) Applicant: TREDEGAR SURFACE PROTECTION, LLC, N. Chesterfield, VA (US)

(72) Inventors: Bankim Bhupendra Desai, Chesterfield, VA (US); Carl Douglas Ray, Chesterfield, VA (US); Ricky Santoso, Glen Allen, VA (US); Shailesh Chunilal Patel, Chesterfield, VA (US); Kevin A. Brady, Cary, IL (US)

(73) Assignee: TREDEGAR SURFACE PROTECTION, LLC, N. Chesterfield, VA (US)

( * ) Notice: Subject to any disclaimer, the term of this patent is extended or adjusted under 35 U.S.C. 154(b) by 247 days.

(21) Appl. No.: 16/159,170

(22) Filed: Oct. 12, 2018

(65) Prior Publication Data

US 2019/0111662 A1    Apr. 18, 2019

Related U.S. Application Data (60) Provisional application No. 62/571,504, filed on Oct. 12, 2017.

(51) Int. Cl.

| | | |
|---|---|---|
| *B32B 15/085* | (2006.01) | |
| *B29C 44/50* | (2006.01) | |
| *B29C 44/24* | (2006.01) | |
| *B29C 48/00* | (2019.01) | |
| *B29C 44/34* | (2006.01) | |
| *B32B 27/06* | (2006.01) | |

(52) U.S. Cl.
CPC ............ *B32B 15/085* (2013.01); *B29C 44/24* (2013.01); *B29C 44/3469* (2013.01); *B29C 44/50* (2013.01); *B29C 48/0012* (2019.02); *B32B 27/06* (2013.01)

(58) Field of Classification Search
CPC ....... B32B 15/085; B32B 27/06; B29C 44/50; B29C 44/24; B29C 44/3469; B29C 48/0012; B29C 48/914; B29C 48/305; B29C 48/21; B29C 48/10; B29C 48/495
See application file for complete search history.

(56) References Cited

U.S. PATENT DOCUMENTS

| | | |
|---|---|---|
| 3,196,062 A | 7/1965 | Kristal |
| 5,527,598 A | 6/1996 | Campbell et al. |
| 5,588,531 A | 12/1996 | Yoshida et al. |
| 6,051,174 A | 4/2000 | Park et al. |
| 6,284,810 B1 | 9/2001 | Burnham et al. |
| 6,391,934 B1 | 5/2002 | Handa et al. |
| 9,321,574 B2 | 4/2016 | Gamer et al. |
| 9,631,060 B2 | 4/2017 | Nishimoto et al. |
| 2002/0076554 A1 | 6/2002 | Stopper |
| 2003/0129343 A1 | 7/2003 | Galkiewicz et al. |
| 2004/0262802 A1 | 12/2004 | Morita et al. |
| 2005/0053768 A1 | 3/2005 | Friedman et al. |
| 2007/0042160 A1* | 2/2007 | Nakajima ......... B32B 17/10761 428/156 |
| 2009/0308774 A1 | 12/2009 | Kim et al. |
| 2011/0206926 A1 | 8/2011 | Marc |
| 2011/0212212 A1 | 9/2011 | Slovencik |
| 2012/0141732 A1* | 6/2012 | Patel ....................... C09J 7/203 428/141 |
| 2012/0164907 A1 | 6/2012 | Restuccia et al. |
| 2013/0303645 A1 | 11/2013 | Dix et al. |
| 2014/0190612 A1 | 7/2014 | Patel et al. |
| 2014/0295134 A1 | 10/2014 | Wood et al. |
| 2014/0342123 A1 | 11/2014 | Chen et al. |
| 2015/0090413 A1 | 4/2015 | Asai et al. |
| 2015/0158270 A1 | 6/2015 | Kim et al. |
| 2016/0311202 A1 | 10/2016 | Aoki et al. |
| 2017/0066224 A1 | 3/2017 | Aoki et al. |
| 2017/0129228 A1* | 5/2017 | Middlesworth ......... B29C 55/18 |
| 2017/0152633 A1 | 6/2017 | Hagihara et al. |

FOREIGN PATENT DOCUMENTS

| | | |
|---|---|---|
| CN | 102615898 A | 8/2012 |
| CN | 103029391 A | 4/2013 |
| CN | 105837891 A | 8/2016 |
| CN | 105856768 A | 8/2016 |
| GB | 2428630 A | 2/2007 |
| JP | H08260692 A | 10/1996 |
| JP | 2006002030 A | 1/2006 |

(Continued)

OTHER PUBLICATIONS

Oxford English Dictionary, 2012, p. 579.*
International Preliminary Report on Patentability dated Apr. 23, 2020, for International Patent Application No. PCT/US2018/055637.
International Search Report and Written Opinion dated Dec. 26, 2018, for International Patent Application No. PCT/US2018/055637.
Sealed Air Cell-Aire Brochure, Sealed Air Corp., Apr. 2009.
Extended European Search Report dated Sep. 3, 2021, for European Patent Application No. 18867153.1.

* cited by examiner

Primary Examiner — Robert S Jones, Jr.
(74) Attorney, Agent, or Firm — Karceski IP Law, PLLC (57) ABSTRACT

Films may be used as interleaves between hard and non-compressible surfaces such as surfaces of sheets or plates made of glass, metal, such as steel, polycarbonate, and/or poly(methyl methacrylate). The films may be embossed and/or may include a foamed core layer having a plurality of micro-voids. In particular, the films may include a polyolefin, a basis weight of between about 30 gsm and about 70 gsm, an embossed thickness of between about 150 microns and 800 microns, and a stiffness of between about 150 grams and about 750 grams according to the Circular Bend Stiffness Test.

25 Claims, 10 Drawing Sheets

(56) References Cited

FOREIGN PATENT DOCUMENTS

| | | |
|---|---|---|
| JP | 2015180534 A | 10/2015 |
| JP | 2015217585 A | 12/2015 |
| JP | 2016034843 A | 3/2016 |
| JP | 2016135582 A | 7/2016 |
| JP | 2016183318 A | 10/2016 |
| KR | 20080082433 A | 9/2008 |
| KR | 20090002860 A | 1/2009 |
| KR | 20110069349 A | 6/2011 |
| KR | 101590147 B1 | 2/2016 |
| KR | 20170038170 A | 4/2017 |
| KR | 101732317 B1 | 5/2017 |
| WO | 2008156233 A1 | 12/2008 |
| WO | 2011006031 A2 | 1/2011 |
| WO | 2012119892 A1 | 9/2012 |

FILMS FOR USE AS INTERLEAVES BETWEEN SUBSTRATES

CROSS-REFERENCE TO RELATED APPLICATIONS

This United States Non-Provisional Patent Applications relies for priority on and claims priority to U.S. Provisional Patent Application Ser. No. 62/571,504, filed on Oct. 12, 2017, entitled "FILMS FOR USE AS INTERLEAVES BETWEEN SUBSTRATES," the entire content of which is incorporated herein by reference.

FIELD

The present invention is directed to films for use as interleaves between substrates, such as glass sheets or plates.

BACKGROUND

Paper interleaves are commonly used by glass sheet manufacturers as protective sheets during handling and transport where multiple glass sheets are typically stacked on an inclined plane side by side or on top of another. The paper interleaf provides protection by acting as a physical barrier that reduces impact and abrasion between the stacked glass sheets. However, paper interleaves often leave behind fine particulates on the surfaces of the glass sheets, which can stain, contaminate, and/or scratch the surfaces of the glass sheets.

It is desirable to provide a replacement interleaf for current paper interleaves for glass sheets that is stiff enough to convert during handling, facilitates placement of interleaving sheets similar to paper, minimizes or eliminates fine particulates, and also provides a cushioning effect between adjacent sheets of glass.

SUMMARY

According to an aspect of the present invention, there is provided a film for use as an interleaf between glass sheets.

According to one embodiment, a film for use as an interleaf between substrates includes a polyolefin, a basis weight of between about 30 gsm and about 70 gsm, an embossed thickness of between about 150 microns and 800 microns, and a stiffness of between about 150 grams and about 750 grams according to the Circular Bend Stiffness Test.

In another embodiment, the polyolefin encompasses polyethylene, high density polyethylene, low density polyethylene, linear low density polyethylene, polypropylene, high crystallinity polypropylene, homopolymer polypropylene, nucleated polypropylene, copolymer polypropylene, and/or blends thereof.

The polyolefin may be polypropylene.

The film may include at least one additive including, but not limited to, a slip agent, a nucleating agent, and an antioxidant stabilizer.

In an embodiment, the film may include a plurality of raised portions on one side thereof and a plurality of protrusions on an opposite side thereof.

Still further, the plurality of raised portions may be a plurality of substantially parallel ribs aligned in a single direction.

The plurality of raised portions may be a first plurality of substantially parallel ribs aligned in a first direction and a second plurality of substantially parallel ribs aligned in a second direction at an angle relative to the first direction.

The angle may range from 0° to 90°.

The first direction may be about 45° relative to a machine direction of the film.

The second direction may be about 90° from the first direction.

The substrates may be made of glass, polycarbonate, poly(methyl methacrylate), or stainless steel.

The present invention also encompasses a film for use as an interleaf between substrates with a foamed core layer made of a polyolefin matrix with a plurality of micro-voids. The foamed core layer is contemplated to define a first side and a second side opposite to the first side. A first skin layer is disposed on the first side. A second skin layer is disposed on the second side. The film has a basis weight of between about 60 gsm and about 80 gsm, a thickness of between about 90 microns and about 200 microns, and a stiffness of between about 250 grams and about 550 grams according to the Circular Bend Stiffness Test.

For the film with the foamed core layer, the stiffness may be between about 300 grams and about 350 grams according to the Circular Bend Stiffness Test.

The film with the foamed core layer also may include a compressibility of between about 5% and about 20%.

The film with the foamed core layer is contemplated to be constructed so that it has a resiliency of between about 80% and about 99%.

For the film with the foamed core layer, the first skin layer and/or the second skin layer also may foamed.

Still further, for the film with the foamed core layer, the first skin layer may have an embossed outer surface with a regular array or a random pattern of formed macro structures integrally formed thereon.

Here, the second skin layer may be and/or include an adhesive surface.

The film with the foamed core layer may be constructed so that one outer surface of the film has an average surface roughness Ra of between about 0.1 μm and about 10 μm.

In addition, the one outer surface of the film may have a surface roughness Rz of between about 1 μm and about 35 μm.

Still further, the one outer surface of the film may have an average spacing between surface peaks Sm of between about 100 μm and about 350 μm.

For the film with the foamed core layer, the polyolefin matrix is contemplated to encompass polyethylene, high density polyethylene, low density polyethylene, linear low density polyethylene, polypropylene, high crystallinity polypropylene, homopolymer polypropylene, nucleated polypropylene, copolymer polypropylene, or blends thereof.

The polyolefin matrix also may include at least one additive including, but not limited to a slip agent, a nucleating agent, and an antioxidant stabilizer.

For this embodiment, the first skin layer and/or the second skin layer may include polyethylene, polypropylene, or blends thereof.

Still further, for the film with the foamed core layer, the first skin layer and/or the second skin layer may incorporate at least one additive such as a slip agent, a nucleating agent, and an antioxidant stabilizer.

The substrates encompass glass, polycarbonate, poly(methyl methacrylate), and stainless steel, among other materials.

These and other aspects, features, and characteristics of the present invention, as well as the methods of manufacturing and functions of the related elements of structure and the combination of parts and economies of manufacture, will become more apparent upon consideration of the following description and the appended claims with reference to the accompanying drawings, all of which form a part of this specification. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

BRIEF DESCRIPTION OF THE DRAWINGS

The components of the following figures are illustrated to emphasize the general principles of the present disclosure and are not necessarily drawn to scale. Reference characters designating corresponding components are repeated as necessary throughout the figures for the sake of consistency and clarity.

FIG. 1b schematically illustrates a side view of the film of FIG. 1a;

FIG. 2b schematically illustrates a side view of the film of FIG. 2a;

FIG. 2c is a microphotograph of a top side of an embodiment of the film of FIG. 2a;

FIG. 2d is a microphotograph of a bottom side of the film of FIG. 2a;

FIG. 7b is a microphotograph of a bottom side of the film of FIG. 7a.

DETAILED DESCRIPTION

Figure 1A:
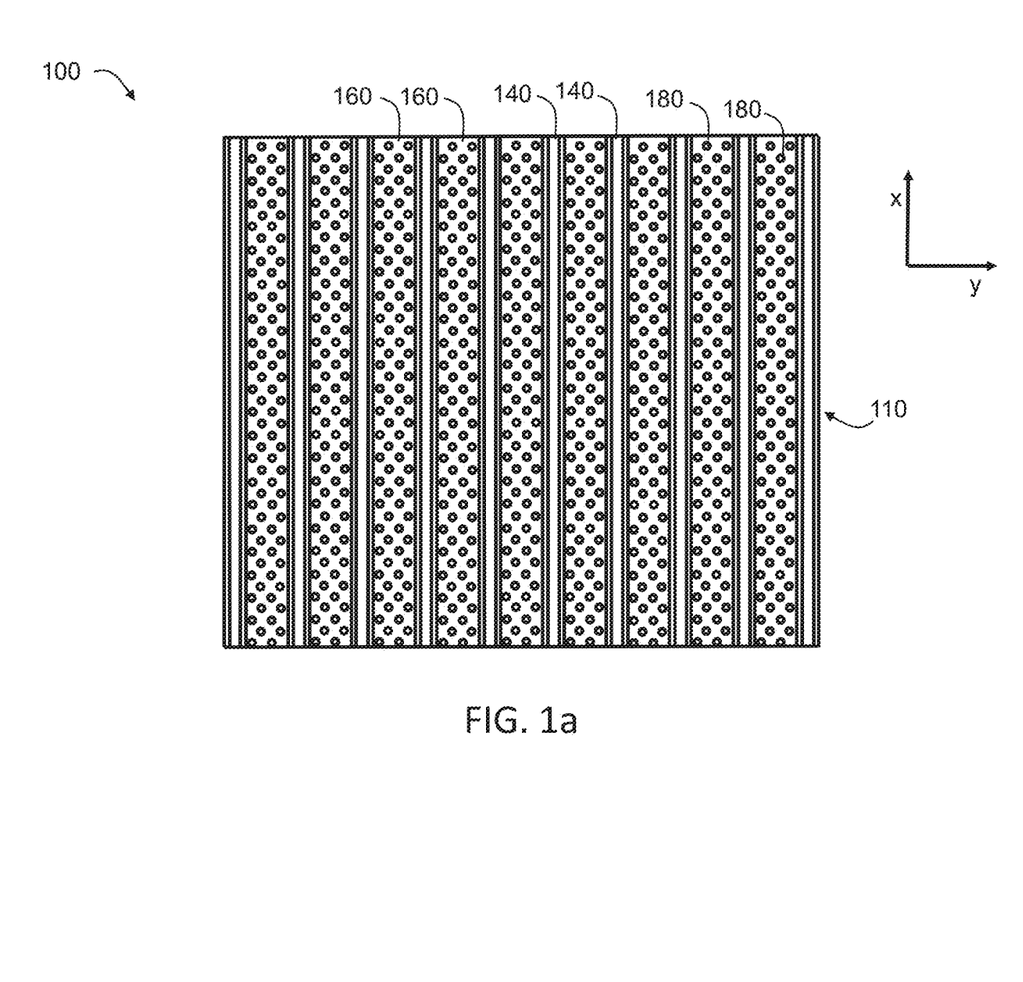
FIG. 1a schematically illustrates a top view of a film in accordance with an embodiment of the invention.
Figure 1B:
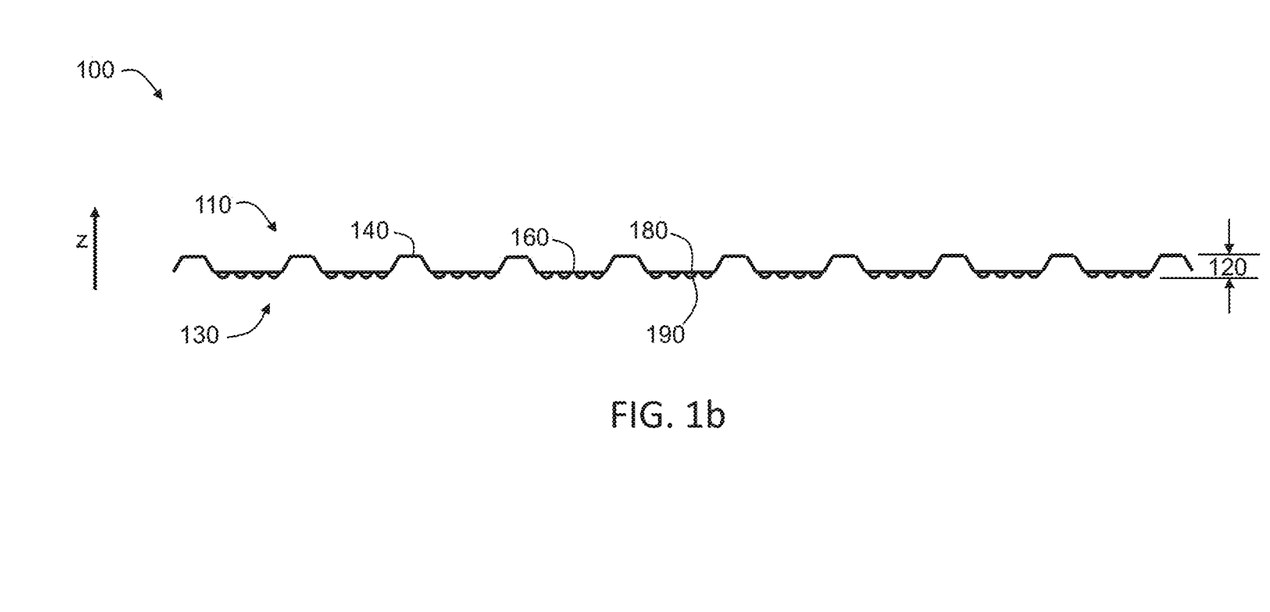

FIGS. 1a and 1b illustrate a film 100 according to an embodiment of the invention. The film 100 has an x-dimension, a y-dimension, and a z-dimension. The x-dimension coincides with the machine direction of the film 100 as it is manufactured on the apparatus illustrated in FIG. 3 and discussed in further detail below. The y-dimension coincides with the transverse direction of the film 100, which is perpendicular to the x-dimension and the machine direction, as it is manufactured on the apparatus illustrated in FIG. 3, and the z-dimension is perpendicular to both the x-dimension and the y-dimension. The film 100 has an embossed height or thickness 120 that extends from a first side 110 of the film 100 to a second side 130 of the film in the z-dimension. The embossed height 120 may be in the range of about 30 microns (μm) to about 800 microns (μm). In an embodiment, the embossed height 120 may be in the range of about 150 microns (μm) to about 800 microns (μm). In an embodiment, the embossed height 120 may be in the range of about 100 microns (μm) to about 300 microns (μm).

In the embodiment illustrated in FIGS. 1a and 1b, the film 100 includes a plurality of "ribs" or raised portions 140 that are offset from a base portion 160 of the film 100. The raised portions 140 are substantially parallel to each other and spaced apart by sections of the base portion 160, which are also substantially parallel to each other. Each section of the base portion 160 includes a plurality of recesses 180 that extend in the z-dimension in a direction that is opposite from the raised portions 140. The plurality of recesses 180 appear as a plurality of protrusions 190 on the opposite side of the base portion 160, which coincides with the second side 130 of the film, as illustrated. When the second side 130 of the film 100 is placed on a flat surface, such as a sheet of glass, only the tips of the protrusions 190 will contact the flat surface. Conversely, when the first side 110 of the film 100 is placed on a flat surface, only the tops of the raised portions 140 will contact the flat surface.

If another sheet of glass is then placed on top or adjacent of the exposed surface of the film 100, either the tops of the raised portions 140 or the tips of the protrusions 190 will contact the second sheet of glass, depending on the orientation of the film 100. The raised portions 140 provide a cushioning effect for the sheets of glass, as well as an increase in flexural stiffness, as compared to a film having the same basis weight but with no embossed structure and substantially parallel and continuous first and second sides (i.e., a "flat" film). It is desirable for the film 100 to have paper-like stiffness for applications as an interleaf between glass sheets.

FIGS. 2a-2f illustrate a film 200 according to an embodiment of the invention. The film 200 has an x-dimension, a y-dimension, and a z-dimension. The x-dimension coincides with the machine direction (MD) of the film 200 as it is manufactured on the apparatus illustrated in FIG. 3 and discussed in further detail below. The y-dimension coincides with the transverse direction (TD) of the film 200, which is perpendicular to the x-dimension and the machine direction, as it is manufactured on the apparatus illustrated in FIG. 3, and the z-dimension is perpendicular to both the x-dimension and the y-dimension. The film 200 has an embossed height or thickness 220 that extends from a first side 210 of the film 200 to a second side 230 of the film 200 in the z-dimension. The embossed height 220 may be in the range of about 30 microns (μm) to about 800 microns (μm). In an embodiment, the embossed height 220 may be in the range of about 150 microns (μm) to about 800 microns (μm). In an embodiment, the embossed height 220 may be in the range of about 100 microns (μm) to about 300 microns (μm).

The film 200 includes a plurality of "ribs" or raised portions 240 that are offset from a base portion 260 of the film 200. The raised portions 240 are arranged in two parallel sets that intersect at 90° angles so as to form a grid such that each section of the base portion 260 is in the general shape of a square and is surrounded by the raised portions 240. In the illustrated embodiment, the raised portions 240 are aligned at angles of about 45° relative to the x-dimension. In other embodiments, the raised portions 240 may be generally aligned at angles between 0° and 90° relative to the x-dimension. In an embodiment, the length of each raised portion 240 surrounding each section of the base portion 260 may be in the range of about 2000 microns (μm)

to about 2500 microns (μm), and the width of each of the raised portions 240 may be in the range of about 150 microns (μm) to about 200 microns (μm).

Each section of the base portion 260 includes a plurality of recesses 280 that extend in the z-dimension in a direction that is opposite from the raised portions 240. The plurality of recesses 280 appear as a plurality of protrusions 290 on the opposite side of the base portion 260, which coincides with the second side 230 of the film, as illustrated. When the second side 230 of the film 200 is placed on a flat surface, such as a sheet of glass, only the tips of the protrusions 290 will contact the flat surface. Conversely, when the first side 210 of the film 200 is placed on a flat surface, only the tops of the raised portions 240 will contact the flat surface.

If another sheet of glass is then placed on top or adjacent to another of the exposed surface, either the tops of the raised portions 240 or the tips of the protrusions 290 will contact the second sheet of glass, depending on the orientation of the film 200. The raised portions 240 provide a cushioning effect for the sheets of glass, as well as an increase in flexural stiffness, as compared to a film having the same basis weight but with no embossed structure and substantially parallel and continuous first and second sides (i.e., a "flat" film). It is desirable for the film 200 to have paper-like stiffness for applications as an interleaf between glass sheets, as discussed in further detail below.

Figure 3:
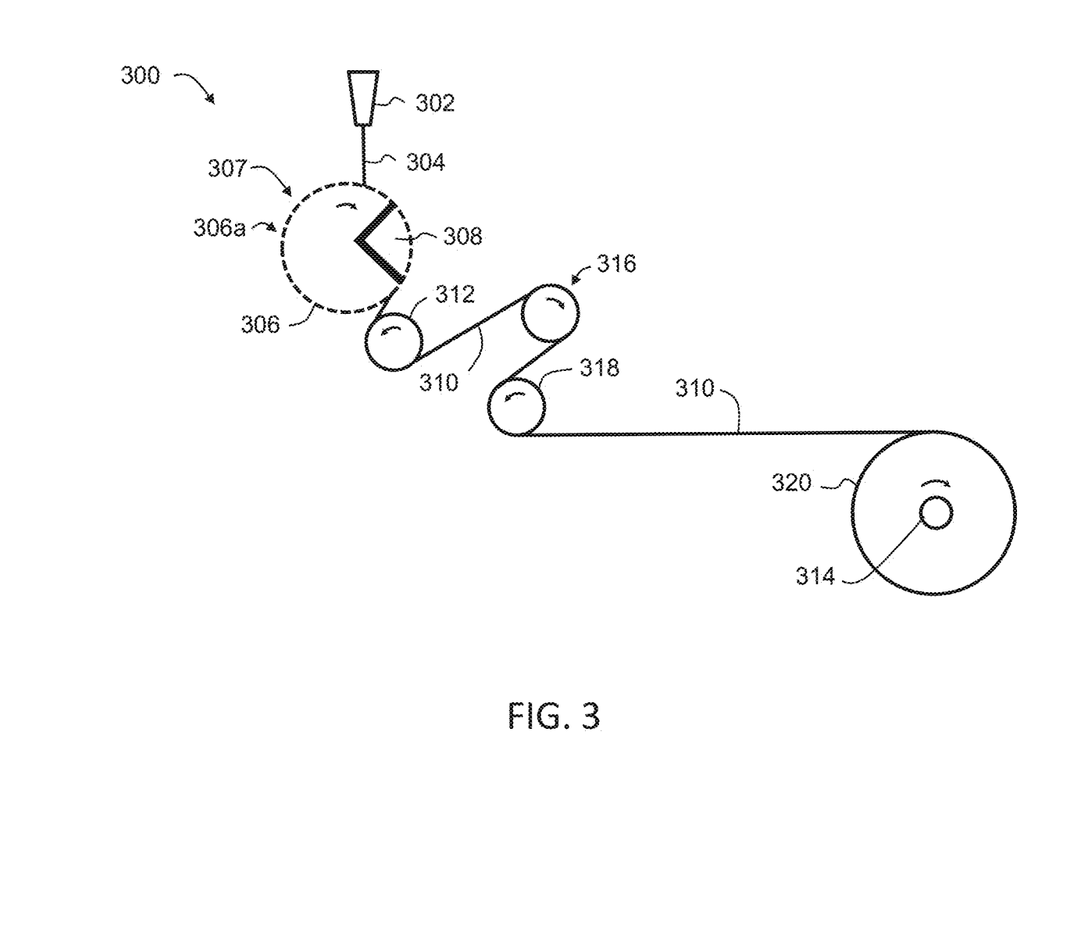
FIG. 3 schematically illustrates an embodiment of an apparatus for manufacturing the embossed films illustrated in FIGS. 1a-2f.

FIG. 3 illustrates an apparatus 300 that may be used to manufacture films in accordance with embodiments of the invention, including the films 100, 200 described above. As illustrated, the apparatus 300 includes an extrusion die 302 that is located at the end of at least one extruder (not shown) and configured to form a polymer web 304, also known as an extrudate or melt curtain. The polymer web 304 may be a single layer or a multi-layer polymer web. The material used to form the polymer web 304 may be blends of polyethylene (PE), high density polyethylene (HDPE), polypropylene (PP), low density polyethylene (LDPE), and linear low density polyethylene (LLDPE), with HDPE and/or PP as major components. The polypropylene may be any one of and/or a combination of high crystallinity PP, homopolymer PP, nucleated PP, and copolymer PP. Still further, an additive may be included in the polyolefin. Additives include, but are not limited to, a slip agent, a nucleating agent, and an antioxidant stabilizer.

In the embodiment illustrated in FIG. 3, the polymer web 304 exits the extrusion die 302 and is deposited onto a forming structure 306 that rotates around a fixed vacuum slot 308 in which a vacuum is pulled. The forming structure 306 and the fixed vacuum slot 308 are part of a forming station 307. The forming structure 306 includes a plurality of openings 306a and a plurality of raised portions (not shown) arranged in one or more patterns. When the polymer web 304 on the forming structure 306 passes over the vacuum slot 308, the portions of the polymer web 304 that are directly over the openings 306a in the forming structure 306 are pulled into the openings 306a to form protrusions on the surface of the polymer web 304 facing the forming structure 306, while the portions of the polymer web 304 that are directly over the raised portions on the forming structure 306 conform to the raised portions to form an embossed film 310. If the vacuum being pulled is high enough (more negative), apertures may be formed at the end of the protrusions to form an apertured web.

The forming structure 306 also cools the polymer web 304 as it is transformed into the embossed film 310 so that the embossed film 310 may be pulled off of the forming structure 306 by a roller 312, conveyed to a winder 314 via additional rollers 316, 318, and wound into a roll 320 by the winder 314. The illustrated embodiment is not intended to be limiting in any way. For example, in another embodiment, instead of extruding the polymer web 304 directly onto the forming structure 306, a polymer web that had been previously extruded onto a chilled roll and quenched into a solid polymer web may be reheated and conveyed to the forming station 307.

In an embodiment, the basis weight of the embossed film 310 may be between about 20 grams per square meter (gsm) and about 200 gsm. In an embodiment, the basis weight of the embossed film 310 may be between about 35 grams per square meter (gsm) and about 70 gsm. In an embodiment, the basis weight of the embossed film 310 may be between about 40 grams per square meter (gsm) and about 65 gsm. In an embodiment, the embossed film 310 may have an embossed thickness of between about 30 microns (μm) and about 800 microns (μm). In an embodiment, the embossed film 310 may have an embossed thickness of between about 120 microns (μm) and about 300 microns (μm). In an embodiment, the embossed film 310 may have an embossed thickness of between about 200 microns (μm) and about 250 microns (μm).

Figure 4:
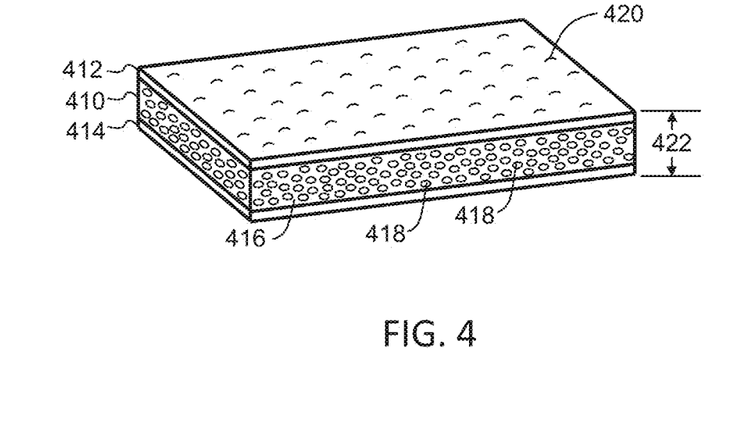
FIG. 4 schematically illustrates a perspective view of a film according to an embodiment of the invention.

FIG. 4 illustrates a film 400 according to an embodiment of the invention. As illustrated, the film 400 includes a foamed core layer 410 sandwiched between two skin layers 412, 414 on opposite sides thereof. The foamed core layer 410 includes a polymer matrix 416 and a plurality of micro-voids 418 that may be formed using the apparatus illustrated in FIG. 5, as described in further detail below. The size and distribution of the micro-voids 418 may be adjusted to achieve the desired flexural stiffness of the film 400 so that the film 400 may be used as an interleaf between glass sheets. In the illustrated embodiment, one of the skin layers 412 has an embossed outer surface 420 that may function as a release surface that does not adhere to the adjoining surface of the substrate (such as glass) that is being protected by the film 400.

The polymer matrix 416 of the foamed core layer 410 may be a blend of predominantly HDPE or PP blended with a minor component selected from a variety of LDPE, LLDPE, and slip or anti-block additives. The skin layers 412, 414 on both sides of the foamed core layer 410 may be blends of PE, HDPE, PP, LDPE, and LLDPE, with HDPE and/or PP as major components. The PP may be any one of and/or a combination of high crystallinity PP, homopolymer PP, nucleated PP, and copolymer PP. Still further, an additive may be included in the polyolefin. Additives include, but are not limited to, a slip agent, a nucleating agent, and an antioxidant stabilizer.

Figures 5, 6:
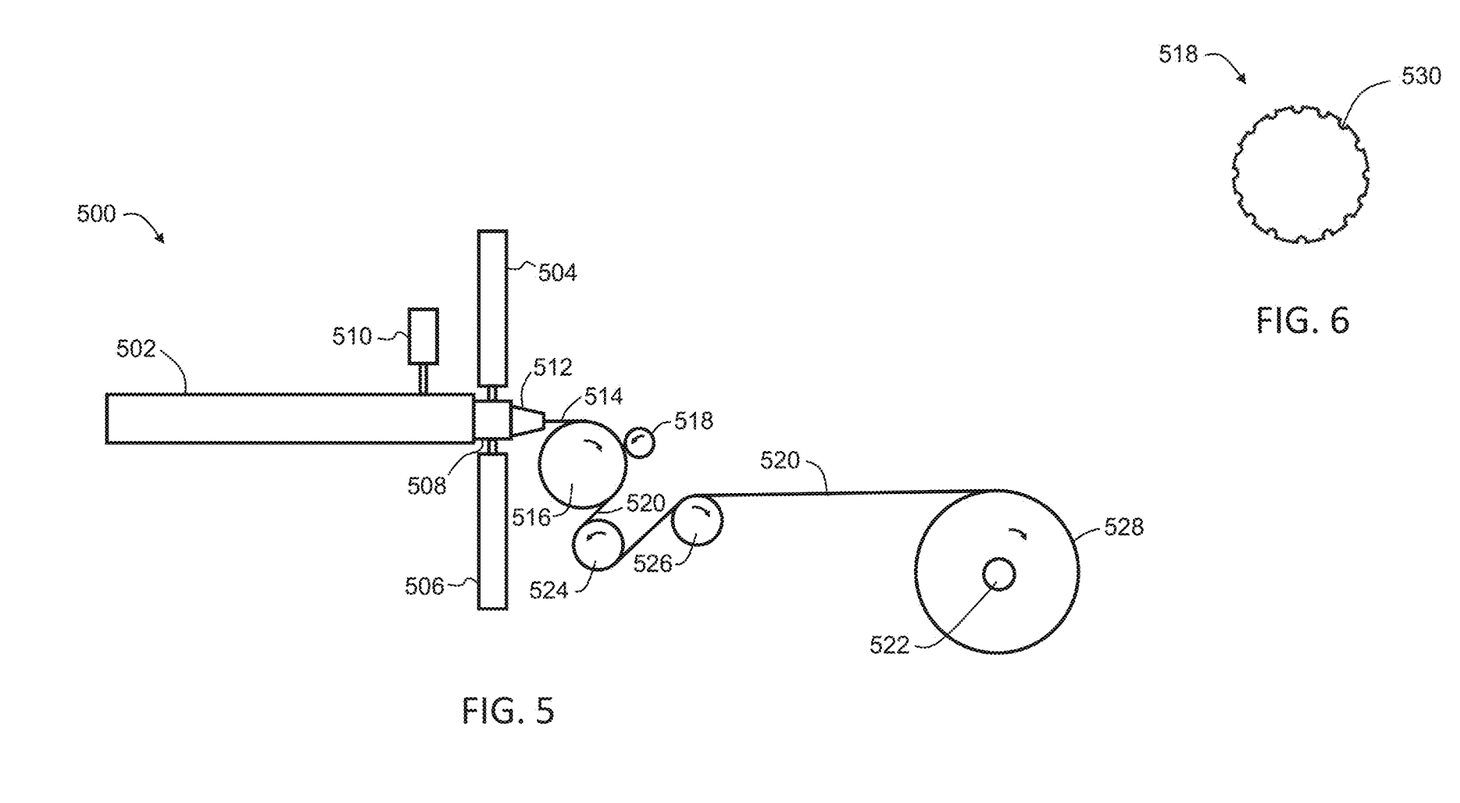
FIG. 5 schematically illustrates an embodiment of an apparatus for manufacturing the film illustrated in FIG. 4.
FIG. 6 schematically illustrates a cross-section of a nip roller that may be used in the apparatus illustrated in FIG. 5.

FIG. 5 schematically illustrates an apparatus 500 that may be used to manufacture the film 400. As illustrated, the apparatus 500 includes a main extruder 502 and two satellite extruders 504, 506 that feed into a feed block 508. The main extruder 502 is adapted to include an injection system 510 for injecting a foaming agent in accordance with the so-called MuCell method, as described in, for example, U.S. Pat. Nos. 6,051,174 and 6,284,810 and United States Patent Application Publication No. 2013/0303645. In an embodiment, one or both of the satellite extruders 504, 506 may also be adapted to include an injection system for injecting a foaming agent in accordance with the MuCell method. The foaming agent may be carbon dioxide, nitrogen, or mixtures thereof. As described in the above-referenced patent documents, the foaming agent may be introduced into the extruder 502 as a supercritical fluid. The main extruder 502 with the injection system 510 is configured to create the foamed core layer 410, and the satellite extruders 504, 506 are configured to create the skin layers 412, 414 described above. The feed block 508 feeds an extrusion die 512, which outputs a melt curtain or extrudate 514 onto a smooth or textured (surface roughness Ra of between 0.01 microns (μm) to about 20 microns (μm)) chrome plated metal casting roller 516. As the extrudate 514 is quenched on the casting roller 516, the extrudate 514 may be embossed with a smooth, ground and/or textured finished rubber embossing roller 518 having surface roughness (Ra) of up to 20 microns (μm) to create a film 520, such as the film 400 illustrated in FIG. 4. The film 520 may be conveyed to a winder 522 by rollers 524, 526 and wound into a roll 528.

An outer surface 530 of the embossing roller 518 may be textured, ground and/or engraved with a fixed or random array of moon shaped concave divots or dimples (similar to the outside surface of a golf ball), as illustrated in greater detail in FIG. 6. The purpose of embossing a fixed array or random divots is to intentionally create an array of isotropic "repeating defects" (i.e., dimples, divots, or indentations) in the film with a fraction of film thickness drawn out or protruded on the embossed surface 420, as illustrated in FIG. 4. The regular and periodic protrusions created on the embossed surface 420 of the film 400 creates a release surface that does not adhere to the adjoining surface of the substrate that is being protected by the film 400. As understood by persons of ordinary skill in the art, the "repeating defects" (i.e., dimples, divots, or indentations) on the embossed surface 420 may have any pattern, density, shape, height, etc., as desired.

In an embodiment, the apparatus 500 may be configured to manufacture blown film, instead of cast film as depicted in FIG. 5. In such an embodiment, the extrusion die 512 may be configured as a circular die that is used in conventional blown film manufacturing lines, and air may be used to expand the extrudate into a bubble, as understood by persons of ordinary skill in the art.

The total basis weight of the film 400 may be in the range of between about 20 gsm and about 200 gsm. In an embodiment, the basis weight of the film 400 may between about 50 gsm and about 100 gsm. In an embodiment, the basis weight of the film 400 may be between about 50 gsm and about 80 gsm. In an embodiment, the basis weight of the film 400 may be about 60 gsm. The total thickness 422 of the film 400 may be in the range between about 30 microns (μm) and about 800 microns (μm), depending on the final desired flexural stiffness. In an embodiment, the total thickness may be between about 50 microns (μm) and about 200 microns (μm). In an embodiment, the total thickness 422 of the film 400 may be in the range between about 90 microns (μm) and about 200 microns (μm). In an embodiment, the total thickness 422 of the film 400 may be in the range of about 80 microns (μm) to about 120 microns (μm).

It is contemplated that other technologies may be used to create the foamed core layer 410. For example, chemical blowing agents and/or fillers may be used to create the micro-voids 418 within the polymer matrix 416 of the foamed core layer 410.

Figure 7A:
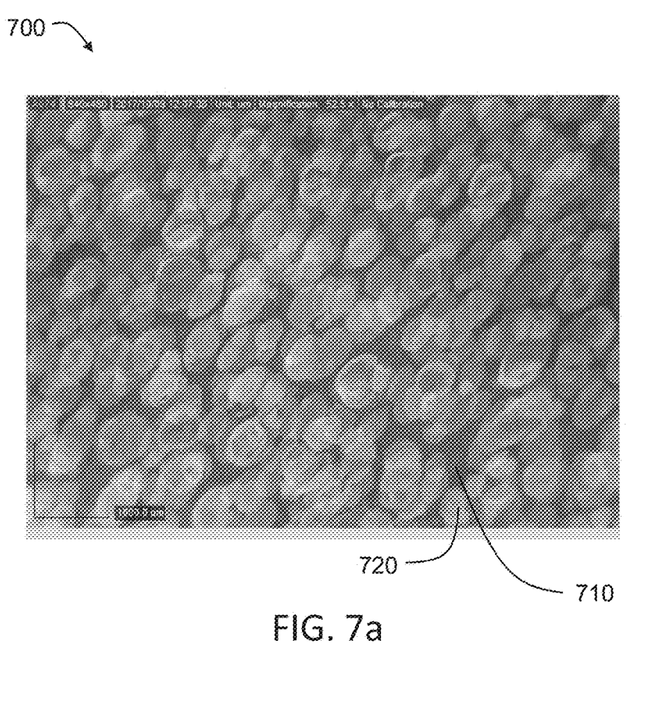
FIG. 7a is a microphotograph of a top side of a film in accordance with an embodiment of the invention.
Figure 7B:
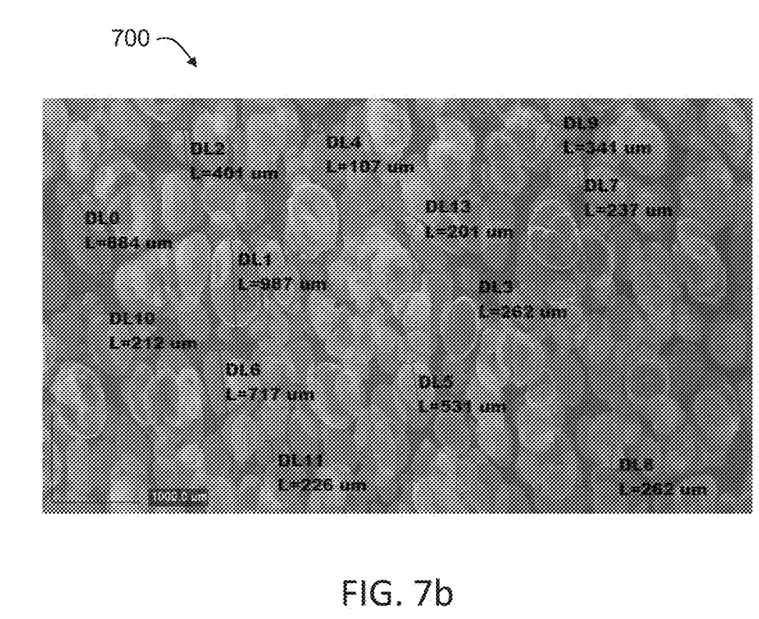

FIGS. 7a and 7b are micrographs of a film 700 that was made using the MuCell method on a blown film manufacturing apparatus (not shown). The film 700 has a polymer matrix 710 comprising HDPE and a plurality of micro-voids 720. Measurements of various micro-voids are indicated in FIG. 7b and range between about 100 microns (μm) and about 1000 microns (μm). It is contemplated that smaller micro-voids having diameters as low as 5 microns (μm) may be achieved.

In applications for which it is desirable to increase the adhesion of the film to the substrate the film is to protect, an additional adhesion layer may be added, particularly on an unembossed side of the film.

Film samples made in accordance with methods described above were manufactured and tested for two types of stiffness, compressibility and resiliency. Example 1 was made with the structure illustrated in FIGS. 2a-2f and a basis weight of about 49 grams per square meter (gsm). Example 2 was made with the structure illustrated in FIGS. 2a-2f and a basis weight of about 70 gsm. Example 3 was made with the structure illustrated in FIGS. 7a and 7b and a basis weight of about 60 gsm. Comparative Example A was a paper having a basis weight of about 49 gsm and used as an interleaf for glass plates. Comparative Example B was a standard printing paper having a basis weight of about 76 gsm and used in photocopying machines and desktop printers. Samples of Examples 1-3 and Comparative Examples A and B were all tested for Gurley Stiffness, Examples 1-3 and Comparative Example B were tested for Circular Bend Stiffness, and Examples 1-3 were tested for Compressibility and Resiliency, as described below.

The Gurley Stiffness Test Method utilized a test instrument (Teledyne Gurley, Model #4171, Digital model, Genuine Gurley stiffness tester) that measures the force required to bend a wide variety of flat materials and dimensional products under controlled and repeatable conditions. The measured force can be equated to stiffness, flexibility or pliability of the tested materials. For each sample, three specimens (n=3) were cut in the machine direction (MD) and tested, and three specimens (n=3) were cut in the transverse direction (TD), perpendicular to the machine direction, and tested. The stiffness values for the MD specimens and the TD specimens were averaged and listed in Table I below.

A Circular Bend Stiffness Test Method utilized a plunger having a flat 25.4 mm (1 inch) diameter surface that forced a sample of the material through an orifice in a platform. The maximum force required to push the sample through the orifice of 38.1 mm (1.5 inches) during a 57 mm (2.25 inches) downward stroke, starting at 3 mm (one-eight inch) above the top of the platform, was measured with a force-measurement gauge. The maximum measured force provides an indication of the material stiffness by measuring the resistance to bending in more than one plane simultaneously.

A Compressibility and Resiliency Test Method was used to evaluate the ability of a film to withstand compression and recover after the compression by measuring the thickness changes after an 862.60 g (30.4 oz.) weight was applied to a sample and removed from the sample. A pressure of 0.98 psi was exerted over 2 square inches. The change in thickness before and after the weight application measures the compression resistance of the film, and the reduction in thickness under the pressure gives the compressibility of the film. The total thickness before the weight was applied and after the weight was removed indicates the film's Resiliency (ability to recover). As used below, Compressibility is a measure of the film's ability to withstand a compressive pressure, and is defined as the compressed thickness divided by the original thickness (multiplied by 100). As used below, Resiliency gauges the film's ability to recover after compression, and is defined as the film's rebound thickness (after the pressure is removed) divided by the original thickness (multiplied by 100).

results of the testing of the additional Comparative Examples are listed in Table II below.

A Low Load Thickness Test Method, which measures the embossed thickness of the films as described above, utilized a motorized micrometer having a 2-inch diameter anvil and dead weight load of 95 g/in$^2$, and using a dwell time of 2-5 seconds. Five measurements were taken across a single film sample, and four different films samples were measured. All measurements were averaged for each Example and reported as "Low Load Thickness" in microns (μm).

A High Load Thickness Test Method, which is typically used to measure the thickness of flat (i.e., unembossed) films, utilized a micrometer having an anvil size of 3/16th of an inch, and dead weight of 113 g. Five measurements were taken across a single film sample, and four different films samples were measured. All measurements were averaged for each Example and reported as "High Load Thickness" in microns (μm).

Comparative Example C was a piece of paper from a steno pad sold by Staples. Comparative Example D was a piece of paper from a steno pad sold by OfficeMax/Office Depot (item #1379800).

TABLE II

Thickness, Stiffness, Compressibility and Resiliency Test Results for Comparative Samples C and D

| Sample | Basis Weight (gsm) | Low Load Thickness (μm) | High Load Thickness (μm) | Circular Bend Stiffness (g) | Compressibility (%) | Resiliency (%) |
|---|---|---|---|---|---|---|
| Comparative Example C | 56.8 | 85 | 77 | 765 | 10.1 | 92.2 |
| Comparative Example D | 55.7 | 82 | 72 | 798 | 13.1 | 89.1 |

TABLE I

Test Results for Examples 1-3 and Comparative Examples A and B

| Sample | Basis Weight (gsm) | Gurley Stiffness (milligram-force) | Circular Bend Stiffness (gram-force) | Compressibility (%) | Resiliency (%) |
|---|---|---|---|---|---|
| Example 1 | 49 | 73 | 245 | 6 | 97 |
| Example 2 | 70 | 208 | 704 | 4 | 98 |
| Example 3 | 60 | 30 | 240 | 20 | 89 |
| Comparative Example A | 49 | 113 | Not Tested | Not Tested | Not Tested |
| Comparative Example B | 76 | 137 | 1502 | Not Tested | Not Tested |

The compressibility and resiliency data provide measures of a cushioning effect provided by Examples 1-3. The higher the compressibility values are with respect to the higher resiliency values approaching closer to 100%, the better the cushioning effect. By optimizing the basis weights and structures of films according to the embodiments of the invention described above, it is expected that the resulting films will provide the desired stiffness and cushioning effect for being used as interleaves between hard substrates, such as glass sheets or plates.

Additional Comparative Examples of paper were tested for basis weight, Circular Bend Stiffness, Compressibility, and Resiliency (described above), as well as Low Load Thickness and High Load Thickness (described below). The Additional samples were made in accordance with embodiments of the invention and tested for various physical properties described herein. Examples 4-6 were manufacturing using the apparatus 300 schematically depicted in FIG. 3.

For Example 4, a blend of 85% polypropylene and 15% low density polyethylene was fed into an extruder and a monolayer melt curtain was extruded onto the forming structure 307 to form an embossed film having the structure generally illustrated in FIGS. 1a-1b, and a basis weight of 44.6 gsm.

Figure 2A:
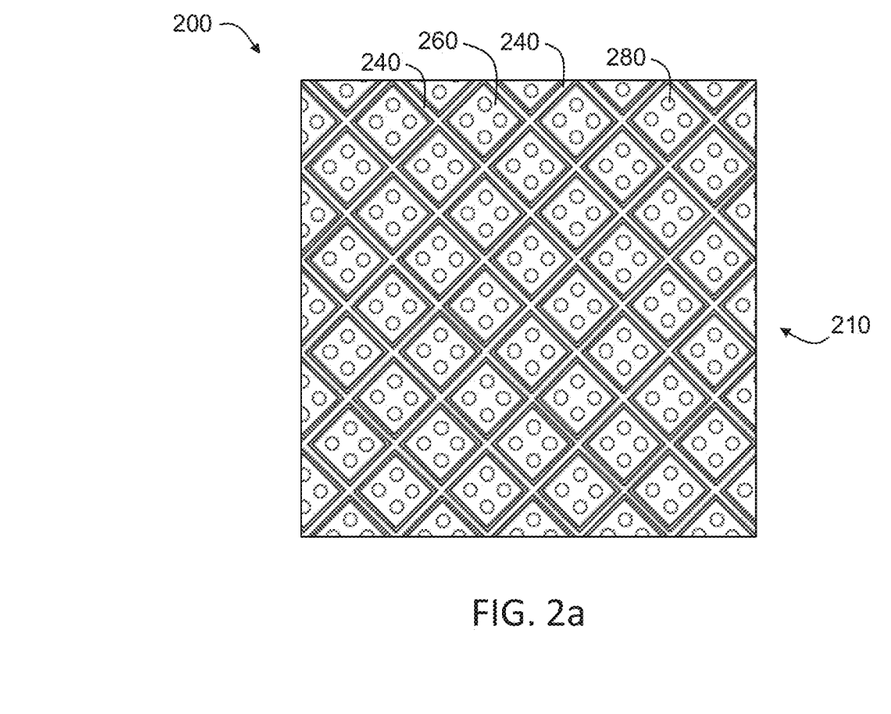
FIG. 2a schematically illustrates a top view of a film in accordance with an embodiment of the invention.
Figure 2B:
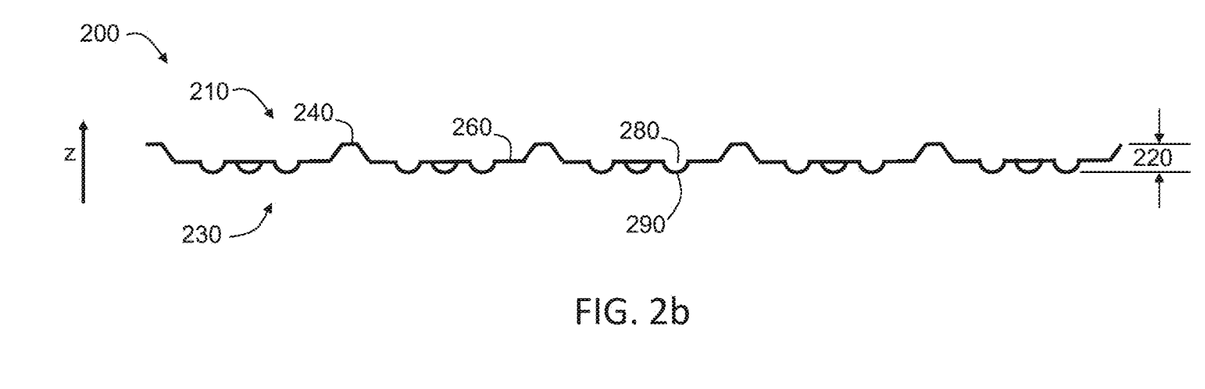
Figure 2C:
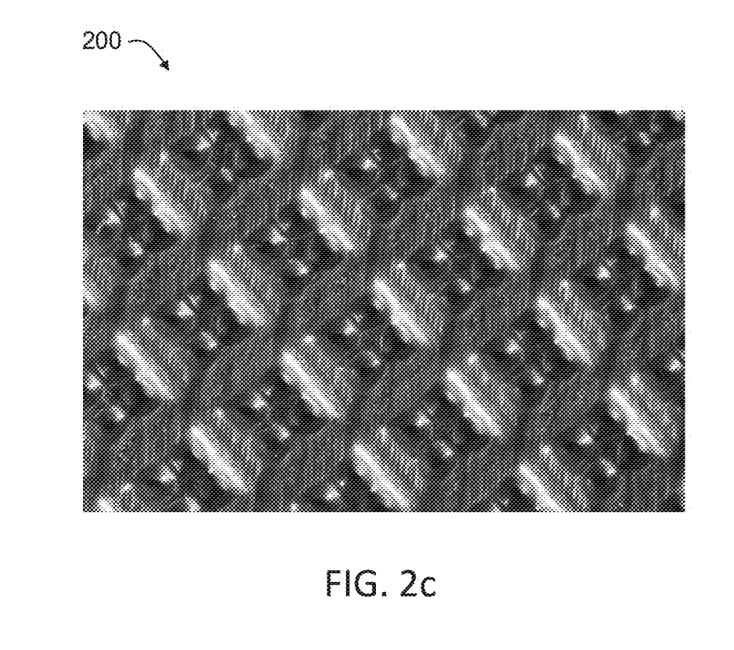
Figure 2D:
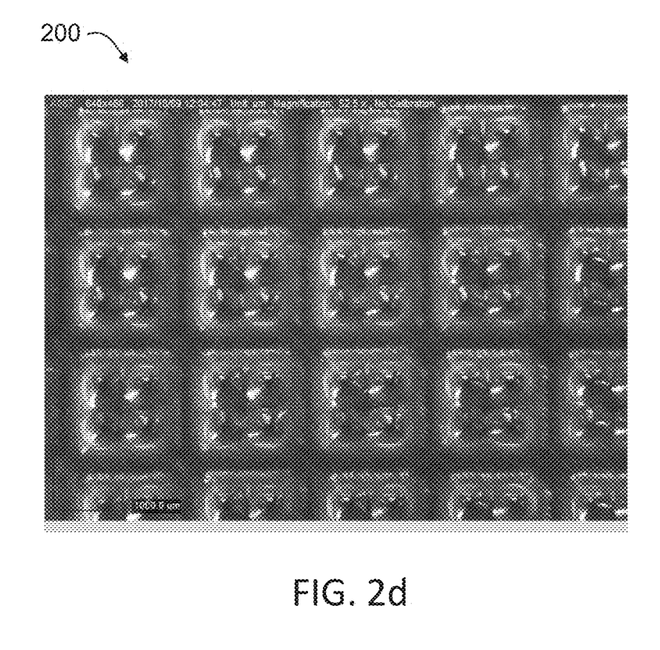
Figure 2E:
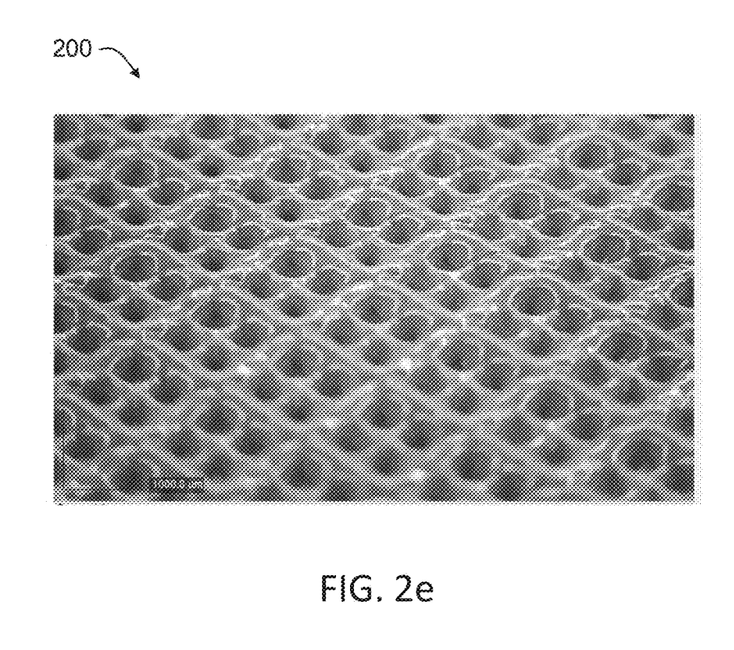
FIG. 2e is a microphotograph taken in perspective view of the top side of the film of FIG. 2c.
Figure 2F:
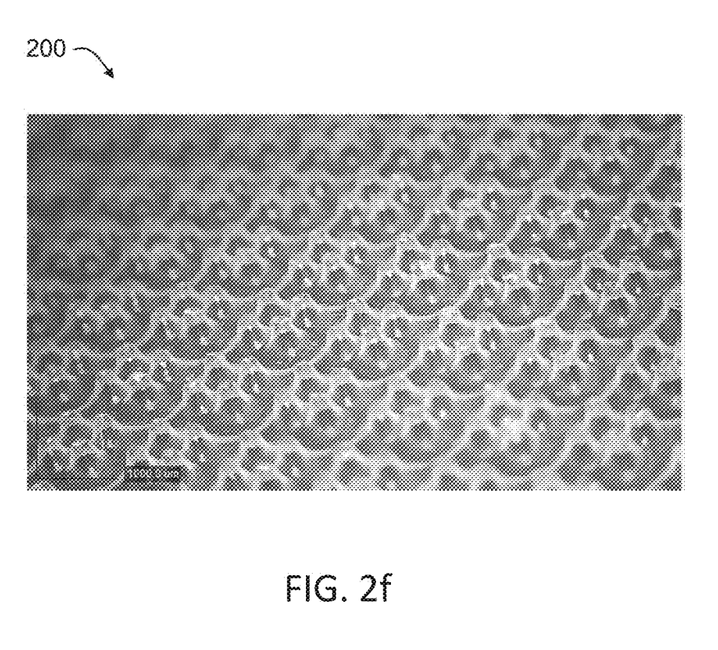
FIG. 2f is a microphotograph taken in perspective view of the bottom side of the film of FIG. 2d.

For Example 5, a three layer melt curtain was extruded onto the forming structure 307 to form an embossed film having the structure generally illustrated in FIGS. 2a and 2b, with the exception that the ribs 240 were oriented parallel to the x and y axes, which coincided with the machine direction (MD) and the transverse direction (TD) of the film. The basis weight of resulting film had a basis weight of 46.8 gsm. All three layers had the same blend of 99% high density polyethylene and 1% low density polyethylene masterbatch with a slip agent.

For Example 6, the same blends of materials that were used for the three layer film in Example 5 were extruded onto the forming structure 307 that was designed to provide the film with a pattern of raised ribs that were all disposed at a 45° angle relative to the machine direction (MD) of the film, as depicted in, for example, FIG. 2a. The basis weight of the resulting film was 64.1 gsm.

The samples were tested for Low Load Thickness, High Load Thickness, Circular Bend Stiffness, Compressibility, and Resiliency in accordance with the test methods described above. The results of such testing for Examples 4-6 are listed in Table III below.

TABLE III

Thickness, Stiffness, Compressibility and Resiliency Test Results for Examples 4-6

| Sample | Basis Weight (gsm) | Low Load Thickness (μm) | High Load Thickness (μm) | Circular Bend Stiffness (g) | Compressibility (%) | Resiliency (%) |
|---|---|---|---|---|---|---|
| Example 4 | 44.6 | 762 | 170 | 683 | 51.2 | 78.1 |
| Example 5 | 46.8 | 397 | 302 | 205 | 4.7 | 96.6 |
| Example 6 | 64.1 | 598 | 519 | 475 | 3.7 | 97.0 |

It is expected that samples having a Circular Bend Stiffness of at least 200 grams will have the desired stiffness to replace paper as an interleaf material.

A Residue Measurement Test Method was used to determine how much residue was deposited on a clean glass surface by a film sample after being aged at an elevated temperature and humidity under a load, and how much of the deposited residue was washed off when the glass was then subjected to washing. Specifically, each film sample was laminated to a clean glass surface and aged for 72 hours in a 55° C., 85% relative humidity environment under a 1.2 kg weight. Prior to lamination, the clean glass surface was analyzed by interferometry at 25 locations within a 50 mm×50 mm area, with each location being 1.40 mm×1.05 mm in size to determine a baseline residue volume already on the glass. After aging, the film was removed and the volume of surface residue on the glass surface was measured in the same 25 locations to determine how much residue was deposited by the film onto the glass. The glass was washed in an automatic dishwasher and the glass surface was measured again in the same 25 locations to determine how much residue remained on the glass. The results for Examples 4, 5 and 6 are listed in Table IV below.

A Particle Count Test Method was completed in accordance with the Helmke Drum Method (Institute of Environmental Sciences and Technology (IEST) RP-CC003.3). Film samples in the size of 125 mm×125 mm squares were introduced to a Helmke Drum chamber and tumbled in the Helmke Drum for 10 minutes at 10 rpm. An airborne particle counter that was connected to the chamber provided particle counts having sizes greater than 0.3 microns (μm) and greater than 0.5 microns (μm). The results for Examples 4-6 are also listed in Table IV below.

TABLE IV

Residue Measurement and Particle Count Test Results for Examples 4-6

| Sample | Deposited Residue (mm³/m²) | Residue After Wash (mm³/m²) | Helmke Drum >0.3 μm Particle Count | Helmke Drum >0.5 μm Particle Count |
|---|---|---|---|---|
| Example 4 | 7 | 1 | 8 | 3 |
| Example 5 | 3 | 1 | 12 | 9 |
| Example 6 | 2 | 3 | 25 | 19 |

Examples 7-11 were prepared using the apparatus 500 illustrated in FIG. 5 and are discussed below.

For Example 7, a three layer melt curtain was extruded onto a casting roller having a surface roughness Ra of 0.01 μm, and an embossing roller having a surface roughness Ra of 1.14 μm contacted the film on an opposite side as the film cooled on the casting roller. The core layer of the three layer structure was a blend of 98% polypropylene and 2% polypropylene masterbatch with a nucleating agent. The core layer for this sample was not foamed. The skin layers of the three layer film were a blend of 98% polypropylene and 2% polypropylene masterbatch with a nucleating agent. The resulting film had a basis weight of 68.8 gsm.

For Example 8, a three layer melt curtain was extruded onto a casting roller having a surface pattern with a surface roughness Ra of 4.19 μm, and an embossing roller having a surface roughness Ra of 2.03 μm contacted the film on an opposite side as the film cooled on the casting roller. The core layer of the three layer structure was a blend of 92% high density polyethylene and 8% polyethylene masterbatch with talc. The core layer was foamed using the MuCell method to create a foamed core layer having a polymer matrix and a plurality of micro-voids having major diameters generally falling within a range between about 0.5 μm and about 12 μm. The skin layers of the three layer film were a blend of 59% high density polyethylene, 40% polypropylene, and 1% polypropylene masterbatch with a nucleating agent. The resulting film had a basis weight of 71.8 gsm.

For Example 9, a three layer melt curtain was extruded onto a casting roller having a surface roughness Ra of 3.81 μm and an embossing roller having a surface roughness Ra of 7.62 μm contacted the film on an opposite side as the film cooled on the casting roller. The core layer of the three layer structure was a blend of 92% high density polyethylene and 8% polyethylene masterbatch with talc. The core layer was foamed using the MuCell method to create a foamed core layer having a polymer matrix and a plurality of micro-voids having major axis diameters generally falling within a range between about 0.3 μm and about 45 μm. The skin layers of the three layer film were a blend of 59% high density polyethylene, 40% polypropylene, and 1% polypropylene masterbatch with a nucleating agent. The resulting film had a basis weight of 67.1 gsm.

For Example 10, a three layer melt curtain was extruded onto a casting roller having a surface roughness Ra of 0.02 μm and an embossing roller having a surface roughness Ra of 2.54 μm contacted the film on an opposite side as the film cooled on the casting roller. The core layer of the three layer structure was a blend of 88% polypropylene, 8% polyethylene masterbatch with talc, 2% low density polyethylene masterbatch with an antioxidant, and 2% polypropylene masterbatch with a nucleating agent. The core layer was foamed using the MuCell method to create a foamed core layer having a polymer matrix and a plurality of micro-voids having major axis diameters generally falling within a range between about 0.3 μm and about 50 μm. The skin layers of the three layer film were a blend of 96% polypropylene, 2% low density polyethylene masterbatch with an antioxidant, and 2% polypropylene masterbatch with a nucleating agent. The resulting film had a basis weight of 69.9 gsm.

For Example 11, a three layer melt curtain was extruded onto a casting roller having a surface roughness Ra of 8.89 μm and an embossing roller having a surface roughness Ra of 7.62 µm contacted the film on an opposite side as the film cooled on the casting roller. The core layer of the three layer structure was a blend of 91% high density polyethylene, 8% polyethylene masterbatch with talc, and low density polyethylene masterbatch with an antioxidant. The core layer was foamed using the MuCell method to create a foamed core layer having a polymer matrix and a plurality of micro-voids having major axis diameters generally falling within a range between about 0.3 µm and about 50 µm. The skin layers of the three layer film were a blend of 65% polypropylene, 34% high density polyethylene, and 1% polypropylene masterbatch with a nucleating agent. The film was annealed at 85° C. for 72 hours. The resulting film had a basis weight of 70.2 gsm.

The samples created for Examples 7-11 were each tested for Low Load Thickness, High Load Thickness, Circular Bend Stiffness, Compressibility and Resiliency, and the results of such tests are listed in Table V below.

TABLE V

Thickness, Stiffness, Compressibility and Resiliency Test Results for Examples 7-11

| Sample | Basis Weight (gsm) | Low Load Thickness (µm) | High Load Thickness (µm) | Circular Bend Stiffness (g) | Compressibility (%) | Resiliency (%) |
| --- | --- | --- | --- | --- | --- | --- |
| Example 7 | 68.8 | 97 | 85 | 498 | 10.5 | 80.4 |
| Example 8 | 71.8 | 97 | 94 | 345 | 6.2 | 90.3 |
| Example 9 | 67.1 | 122 | 110 | 275 | 9.2 | 92.2 |
| Example 10 | 69.9 | 115 | 89 | 435 | 9.4 | 92.9 |
| Example 11 | 70.2 | 145 | 125 | 387 | 16.2 | 88.3 |

The surfaces of each side (i.e., the side that contacted the casting roller and the side that contacted the embossed roll) of the samples created for Examples 7-11, as well as Comparative Example D were tested for surface roughness, including Ra (surface roughness average), Rz (average of heights of five highest peaks and five lowest valleys), and Sm (average spacing between peaks), with a surface roughness measuring instrument manufactured by Kosaka Laboratory Ltd. The results of the surface roughness testing are listed in Table VI below.

TABLE VI

Surface Roughness Test Results for Examples 7-11 and Comparative Example D

| Sample | Side of Film | Ra (µm) | Rz (µm) | Sm (µm) |
| --- | --- | --- | --- | --- |
| Example 7 | Casting Roller | 0.08 | 0.26 | 320 |
|  | Embossing Roller | 0.75 | 2.98 | 150 |
| Example 8 | Casting Roller | 5.19 | 15.02 | 200 |
|  | Embossing Roller | 1.29 | 4.38 | 230 |
| Example 9 | Casting Roller | 5.03 | 18.07 | 340 |
|  | Embossing Roller | 2.99 | 11.08 | 190 |
| Example 10 | Casting Roller | 0.13 | 1.31 | 160 |
|  | Embossing Roller | 1.05 | 3.79 | 310 |
| Example 11 | Casting Roller | 8.97 | 30.39 | 260 |
|  | Embossing Roller | 4.46 | 15.49 | 300 |
| Comparative Example D | Side 1 | 2.02 | 7.58 | 200 |

The samples created for Examples 7-10 were also tested in accordance with the Residue Measurement Test Method and the Particle Count Test Method, as described above, and the results are listed in Table VII.

TABLE VII

Residue Measurement and Particle Count Test Results for Examples 7-10

| Sample | Deposited Residue (mm³/m²) | Residue After Wash (mm³/m²) | Helmke Drum >0.3 µm Particle Count | Helmke Drum >0.5 µm Particle Count |
| --- | --- | --- | --- | --- |
| Example 7 | 8 | 0 | 32 | 28 |
| Example 8 | 3 | 0 | 40 | 37 |
| Example 9 | 6 | 0 | 27 | 23 |
| Example 10 | 10 | 0 | 150 | 133 |

It is noted that any of the embodiments of the films and/or foam described herein may be modified by adding high crystallinity polypropylene to the polypropylene in the mixture. High crystallinity polypropylene is understood to increase the overall stiffness of the material into which the high crystallinity polypropylene is incorporated.

The polymer films provided by embodiments of the invention are designed to replace the paper currently being used in the glass industry as an interleaf material to protect multiple stacked glass sheets during storage and transportation to the user destination. Typically, the "repeating defects," i.e., dimples, divots, indentations, and/or raised portions of the embossed films may be considered harmful to soft and sensitive optical substrates that would transcribe to the functional substrate, thereby rendering the substrate unusable for high resolution displays. In contrast, when glass or similar hard surfaces namely, polycarbonate (PC), poly(methyl methacrylate) (PMMA), polished stainless steel is the substrate to be protected, the hardness of such substrates resists any deformation caused by the repeating defects and embossed surfaces of the polymer films, and regular or random repeating defects or raised protrusions may help in creating a release surface to allow a clean separation of one glass sheets from an adjoining glass sheet while unstacking from a pack of multiple glass sheets being stored or transported even after considerable age on the shelf.

Embodiments of the invention are directed to address a chronic issue faced by the optical glass manufacturers who are significantly impacted by yield losses of glass during storage and transportation due to staining and scratches caused by the ingredients used in manufacturing paper interleaves. Potential advantages of films according to embodiments of the invention include recyclability, adjustable coefficient of friction, lower migratory species and particulates than paper, low static charge, and/or cushioning.

It is contemplated that embodiments of the invention may also be used to protect other substrates in addition to glass. For example, any hard and non-compressible surface, such as surfaces of metal, such as steel, polycarbonate (PC), poly(methyl methacrylate) (PMMA), and/or sheets or plates made of other thermoplastic or thermoset polymers, may be protected with polymer films according to embodiments of the invention.

The embodiments described herein represent a number of possible implementations and examples and are not intended to necessarily limit the present disclosure to any specific embodiments. Instead, various modifications can be made to these embodiments as would be understood by one of ordinary skill in the art. Any such modifications are intended to be included within the spirit and scope of the present disclosure and protected by the following claims.

What is claimed is:

1. A film for use as an interleaf between substrates, comprising:
    a polyolefin;
    a base portion;
    a plurality of raised portions offset from the base portion on one side of the base portion and a plurality of protrusions on an opposite side of the base portion, wherein the plurality of raised portions comprises a plurality of substantially parallel ribs;
    a basis weight of between about 30 gsm and about 70 gsm;
    an embossed thickness of between about 150 microns and 800 microns; and
    a stiffness of between about 150 grams and about 750 grams according to the Circular Bend Stiffness Test.

2. The film according to claim 1, wherein the polyolefin comprises polyethylene, high density polyethylene, low density polyethylene, linear low density polyethylene, polypropylene, high crystallinity polypropylene, homopolymer polypropylene, nucleated polypropylene, copolymer polypropylene, or blends thereof.

3. The film according to claim 1, wherein the polyolefin is polypropylene.

4. The film according to claim 1, further comprising at least one additive selected from the group consisting of a slip agent, a nucleating agent, and an antioxidant stabilizer.

5. The film according to claim 1, wherein the plurality of substantially parallel ribs are aligned in a single direction.

6. The film according to claim 1, wherein the plurality of substantially parallel ribs comprise a first plurality of substantially parallel ribs aligned in a first direction and a second plurality of substantially parallel ribs aligned in a second direction at an angle relative to the first direction.

7. The film according to claim 6, wherein the angle ranges from 0° to 90°.

8. The film according to claim 6, wherein the first direction is about 45° relative to a machine direction of the film.

9. The film according to claim 8, wherein the second direction is about 90° from the first direction.

10. The film according to claim 1, wherein the substrates are comprised of glass, polycarbonate, poly(methyl methacrylate), or stainless steel.

11. A film for use as an interleaf between substrates, comprising:
    a foamed core layer comprising a polyolefin matrix with a plurality of micro-voids, wherein the foamed core layer defines a first side and a second side opposite to the first side;
    a first skin layer on the first side;
    a second skin layer on the second side;
    a basis weight of between about 60 gsm and about 80 gsm;
    a thickness of between about 90 microns and about 200 microns; and
    a stiffness of between about 250 grams and about 550 grams according to the Circular Bend Stiffness Test.

12. The film according to claim 11, wherein the stiffness is between about 300 grams and about 350 grams according to the Circular Bend Stiffness Test.

13. The film according to claim 11, further comprising a compressibility of between about 5% and about 20%.

14. The film according to claim 11, further comprising a resiliency of between about 80% and about 99%.

15. The film according to claim 11, wherein the first skin layer and/or the second skin layer is foamed.

16. The film according to claim 11, wherein the first skin layer comprises an embossed outer surface with a regular array or a random pattern of formed macro structures integrally formed thereon.

17. The film according to claim 16, wherein the second skin layer comprises an adhesive surface.

18. The film according to claim 11, wherein at least one outer surface of the film has an average surface roughness Ra of between about 0.1 μm and about 10 μm.

19. The film according to claim 11, wherein at least one outer surface of the film has a surface roughness Rz of between about 1 μm and about 35 μm.

20. The film according to claim 11, wherein at least one outer surface of the film has an average spacing between surface peaks Sm of between about 100 μm and about 350 μm.

21. The film according to claim 11, wherein the polyolefin matrix comprises polyethylene, high density polyethylene, low density polyethylene, linear low density polyethylene, polypropylene, high crystallinity polypropylene, homopolymer polypropylene, nucleated polypropylene, copolymer polypropylene, or blends thereof.

22. The film according to claim 21, wherein the polyolefin matrix further comprises at least one additive selected from the group consisting of a slip agent, a nucleating agent, and an antioxidant stabilizer.

23. The film according to claim 11, wherein the first skin layer and/or the second skin layer comprise polyethylene, polypropylene, or blends thereof.

24. The film according to claim 23, wherein the first skin layer and/or the second skin layer further comprises at least one additive selected from the group consisting of a slip agent, a nucleating agent, and an antioxidant stabilizer.

25. The film according to claim 11, wherein the substrates are comprised of glass, polycarbonate, poly(methyl methacrylate), or stainless steel.

* * * * *